United States Patent Office.

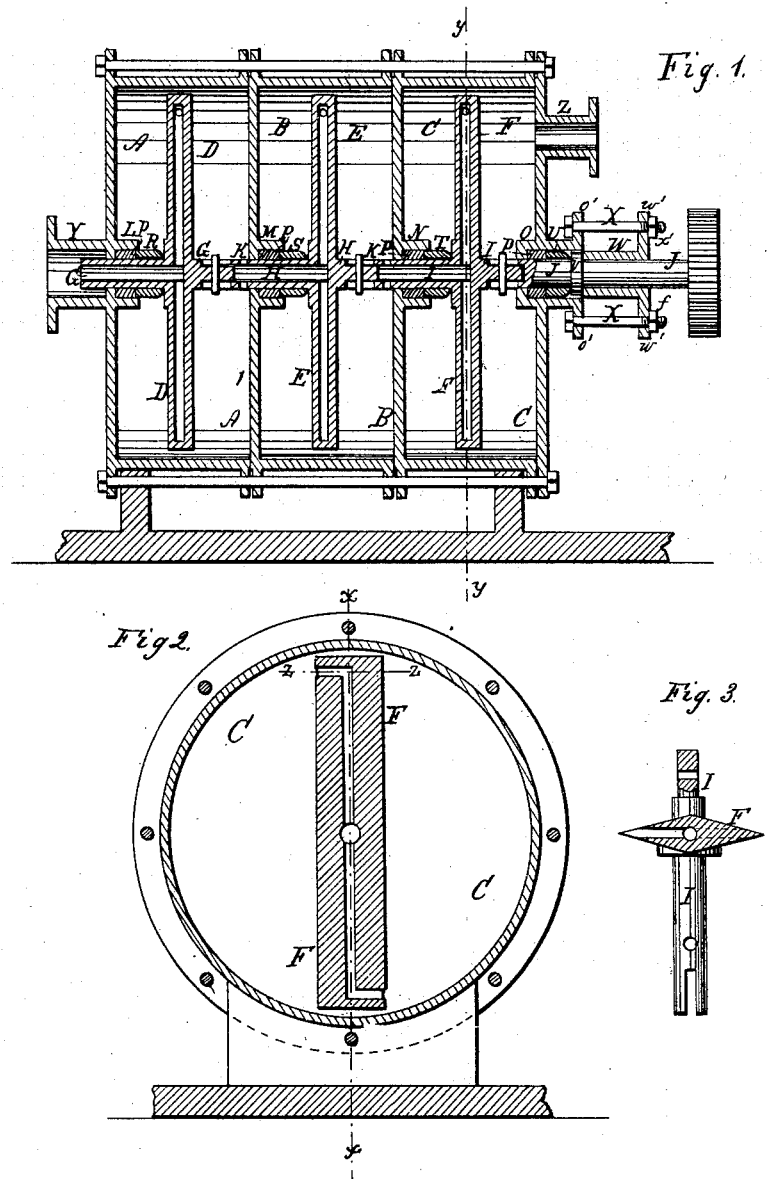

THOMAS BANTA, OF HOBOKEN, NEW JERSEY.

*Letters Patent No. 65,154, dated May 28, 1867.*

---

IMPROVEMENT IN ROTARY STEAM ENGINES.

---

The Schedule referred to in these Letters Patent and making part of the same.

---

TO ALL WHOM IT MAY CONCERN:

Be it known that I, THOMAS BANTA, of Hoboken, in the county of Hudson, and State of New Jersey, have invented a new and improved Rotary Engine; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved engine, taken through the line $x\ x$, fig. 2.

Figure 2 is a vertical cross-section of the same, taken through the line $y\ y$, fig. 1.

Figure 3 is a detail sectional view of the same, taken through the line $z\ z$, fig. 2.

Similar letters of reference indicate like parts.

My invention has for its object to furnish an improved rotary engine, so constructed and arranged as to utilize the expansion of the steam, and avoid the difficulties arising from the back pressure caused by the condensation of the steam upon the interior surface of the cylinder, and its subsequent expansion into steam; and it consists in the combination of two or more sets of radial arms and their shafts with each other, and with the cylinder in which they work, said shafts being so connected as to form a continuous shaft; and in the combination and arrangement of parts by means of which the packing in the entire series of packing-boxes may be tightened at the same time from the outside of the cylinder; the whole being constructed and arranged as hereinafter more fully described.

A, B, and C are a series of steam-tight cylinders, placed end to end, and securely connected together in such a way that the bottom of one cylinder may form the top of the preceding one, as shown in fig. 1. D, E, and F are sets of radial arms, each set of which is cast solid with or securely attached to its own shaft. The shafts G, H, and I are all made precisely alike, as shown in the drawings; that is to say, one end of each of said shafts is hollow and the other end is solid, and has a round tenon formed upon it, fitting into the hollow end of the contiguous shaft. The shafts G, H, and I are made to revolve together by pins passing through the said round tenons, and through slots in the hollow ends of the shafts, into which the said round tenons enter, as shown in the drawings, thus compelling the shafts to revolve together, but allowing them to have a slight longitudinal movement upon each other. In the same manner the shaft I is connected to the shaft J, which passes out through the end of the cylinder C, and from which motion is communicated to the desired machinery. The arms D, E, and F are made wedge-shaped on each side, so that they may move with the least possible resistance; and they have a cavity extending longitudinally through them, the lower end of which communicates with the hollow or cavity in the shafts to which the said arms are attached. At the outer ends of the arms D, E, and F, these cavities turn at right angles and pass out through openings in the side edges of said arms, as shown in fig. 2; the openings or discharging orifices of the arms E being larger than those of the arms D, and the openings of the arms F being larger than those of the arms E, and so on through the series. The steam or other elastic vapor is admitted to the hollow shafts G H I through holes or openings K formed in the sides of the shafts, as shown in figs. 1 and 3. Upon each plate of the cylinders A, B, and C, through which the shafts G H I J pass, are formed stuffing-boxes L M N O, in which is placed the packing P, which is confined in said boxes by the rings R S T U, as shown in fig. 1. The packing P is packed or tightened by having the rings R S T U pressed down upon it in the manner hereinafter described. The rings R S T are fitted upon the shafts G H I respectively, in such a position that their forward ends may enter the packing-boxes, and their rear ends, which are bevelled or rounded off to present smaller bearing surfaces, rest against the arms D E F of the shafts. In the same manner the ring U is fitted upon the shaft J, with its forward end entering the stuffing-box O, and its rear end resting against the flange V formed upon the said shaft J. The sides of the packing-box O are extended outward, and have a flange, $o'$, formed upon their outer edge. W is a ring fitted upon the projecting part of the shaft J, with its forward end resting against the flange V, and having a flange, $w'$, formed upon its outer end similar to the flange $o'$. The flanges $o'$ and $w'$ are connected by rods X passing through holes in the said flanges, and having nuts $x'$ upon their ends, as shown in fig. 1. By tightening the nuts $x'$ upon the rods X the ring W will be forced against the flange V, forcing all the shafts J I H G forward, and thereby forcing the rings U T S R further into the packing-boxes and tightening the packing P.

In using the engine, the steam or other elastic vapor is admitted through the pipe Y, passing through the hollow shaft G and radial arms D, escaping into the cylinder A through the openings in the side edges of said arms. From the cylinder A it passes through the holes K into the hollow shaft H, and escapes into the cylinder B through the larger openings in the side edges of the arms E, and so on through the series, and finally escapes through the exhaust pipe Z, thus utilizing the expansion of the steam.

Having thus described my invention, what I claim as new, and desire to secure by Letters Patent, is—

1. The combination of the rings R S T U with the stuffing-boxes L M N O, shafts G H I J, radial arms D E F, and flange V, substantially as herein shown and described and for the purposes set forth.

2. The combination of the flanged ring W and rods X with the shaft J, flange V, and flanged end of the packing-box O, substantially as herein shown and described, and for the purpose set forth.

The above specification of my invention signed by me this 28th day of February, 1867.

THOMAS BANTA.

Witnesses:
WM. F. McNAMARA,
JAMES T. GRAHAM.